United States Patent [19]

Jones

[11] Patent Number: 4,460,974

[45] Date of Patent: Jul. 17, 1984

[54] ELECTRONIC COMPUTER WITH ACCESS TO KEYBOARD STATUS INFORMATION

[75] Inventor: Vincent C. Jones, Fort Collins, Colo.

[73] Assignee: Hewlett-Packard Company, Palo Alto, Calif.

[21] Appl. No.: 325,407

[22] Filed: Nov. 27, 1981

[51] Int. Cl.³ .......................... G06F 15/12; G06F 3/14
[52] U.S. Cl. ................................................... 364/900
[58] Field of Search ................ 364/200, 900, 705, 706

[56] References Cited

U.S. PATENT DOCUMENTS

| | | | |
|---|---|---|---|
| 3,855,461 | 12/1974 | Stockwell | 364/706 |
| 4,037,092 | 7/1977 | Osborne et al. | 364/706 |
| 4,200,913 | 4/1980 | Kuhar et al. | 364/900 |
| 4,200,926 | 4/1980 | Cochran et al. | 364/200 |
| 4,203,152 | 5/1980 | Watson et al. | 364/200 |
| 4,280,121 | 7/1981 | Crask | 364/706 |
| 4,291,385 | 9/1981 | Osborne et al. | 364/706 |

Primary Examiner—Jerry Smith
Assistant Examiner—Jameson Lee
Attorney, Agent, or Firm—Douglas A. Kundrat

[57] ABSTRACT

A keyboard-programmable electronic computer utilizes a user-accessible table located in memory to allow the user to list memory addresses to be associated with various key codes corresponding to keys on the keyboard. When a key is depressed upon the keyboard, the computer checks the table for the corresponding key code and, if it is listed therein, the user-written subroutine located in memory at the address associated with the key code is performed. The user-written subroutine has the capability of utilizing both the events of key depression and the status of continued key depressions as program variables.

3 Claims, 4 Drawing Figures 4,460,974

ELECTRONIC COMPUTER WITH ACCESS TO KEYBOARD STATUS INFORMATION

BACKGROUND AND SUMMARY OF THE INVENTION

The present invention relates generally to electronic digital computers and more particularly to electronic computers which are user programmable in a high-level-language, such as BASIC, via a keyboard. When writing a high-level-language program on a computer constructed according to the prior art, the user types his program on a keyboard and the computer's operating system detects key depression events and loads a key code corresponding to each depressed key into memory as part of the user's line of programming. When such a prior art computer is used to run the user's program, information can be communicated by the user from the alphanumeric keys on the keyboard to the computer only by causing an internal interrupt service routine to detect a key depression event and to a load a key code into a buffer for future use as a variable by the user's program. Information can also be communicated to such a prior art computer during the running of a high-level-language program by depressing one of a limited number of dedicated keys on the keyboard. Such a dedicated key is connected by hardware so as to cause the implementation of a machine language program which overrides the user's program and causes a predetermined occurrence to happen. An example of such a hard-wired dedicated key is a "STOP" key which causes the user's program to be aborted.

A major disadvantage inherent in computers constructed according to the prior art is that, when writing a high-level-language program on the keyboard, the user is limited to the predetermined key definitions of the keyboard interface and the computer's operating system. The user does not have the flexibility to load into memory anything other than a single predetermined key code for each key depression event. Another disadvantage inherent in the prior art is that, while the user's program is being run, the user does not have the flexibility to communicate anything other than event information for use by the high-level-language program.

The present invention is directed to an electronic computer in which the user has a great deal of flexibility in communicating information from the keyboard to the computer. In a preferred embodiment of the present invention, the detection of a key depression causes a user-accessible table located in random access memory (RAM) to be checked for the ASCII key code of the depressed key. If the key code is found in the table, a memory address associated in the table with the key code is obtained and further operations are implemented according to the instructions stored at that user-accessible memory location. Such flexibility allows the user to redefine the keys of the keyboard as desired. It also allows the user to write subroutines to be implemented upon the depression of specific keys and to use the status of the key depressions as well as event information as subroutine variables.

DESCRIPTION OF THE PREFERRED EMBODIMENT

Figure 1:
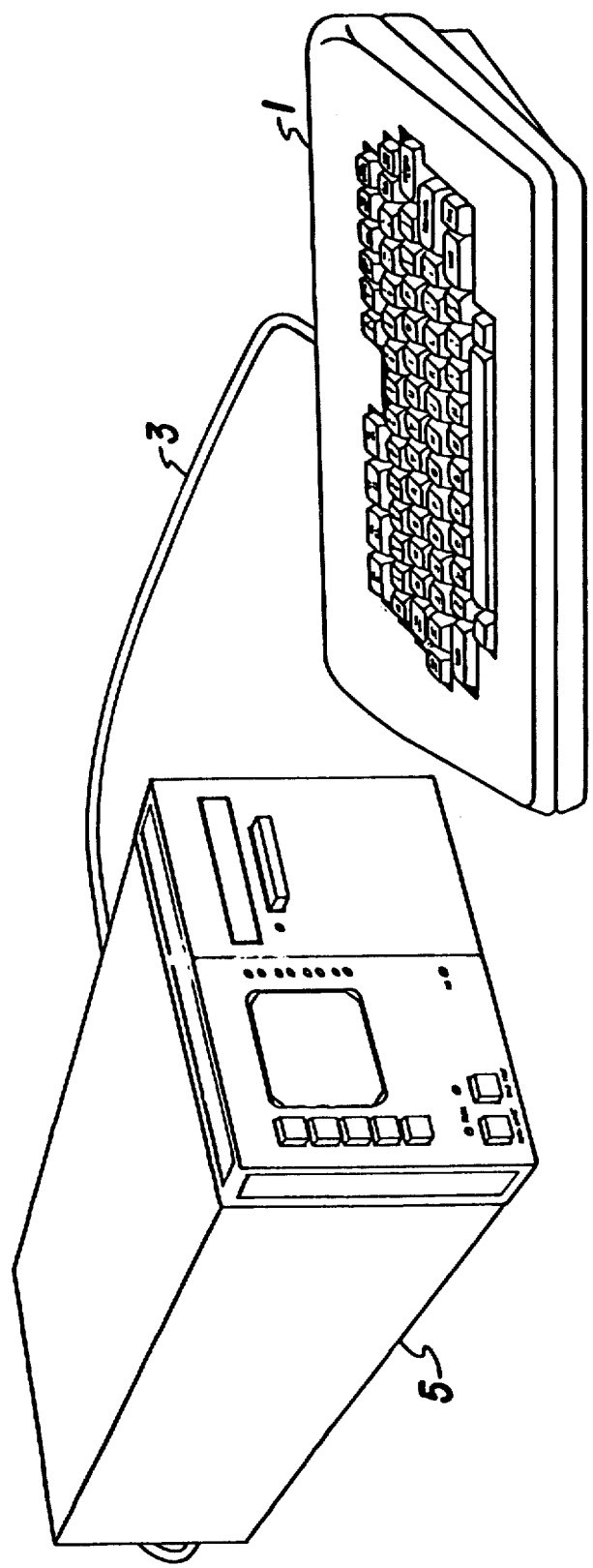
FIG. 1 is a perspective view of an electronic computer which incorporates a preferred embodiment of the present invention.

Referring now to FIG. 1, there is shown a keyboard 1 connected by a cable 3 to a computer 5 which incorporates a preferred embodiment of the present invention.

Figure 2:
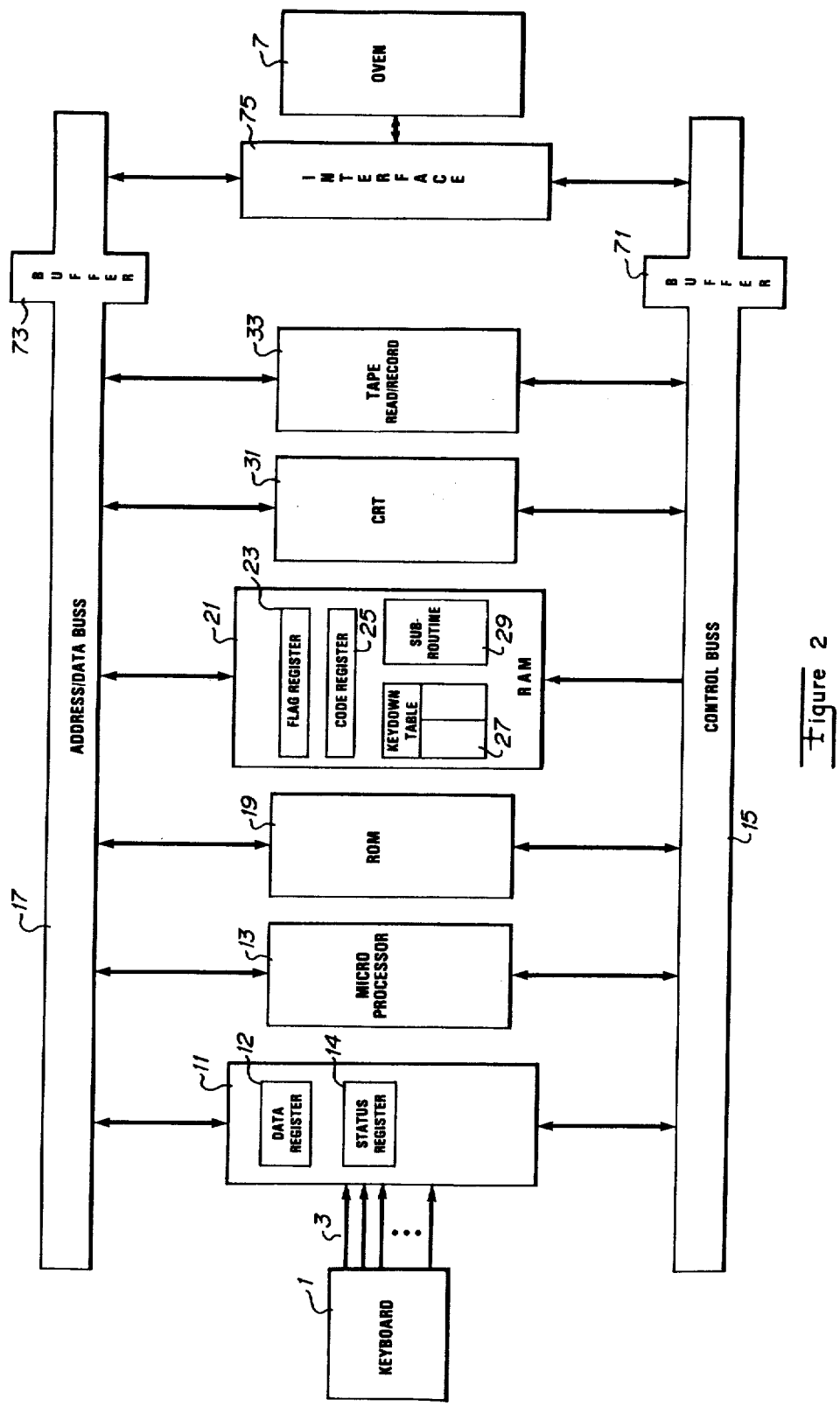
FIG. 2 is a block diagram of an electronic computer which incorporates a preferred embodiment of the present invention.

The operation of computer 5 may be better understood with reference to the block diagram of FIG. 2. Keyboard 1 comprises an arrangement of switches wherein information identifying the specific switch activated is generated. Exemplary of such an arrangement is a keyboard, such as the Hewlett-Packard Co. model 98155A keyboard, which generates a matrix pair to identify the specific key depressed. Cable 3, which consists of a multiplicity of parallel lines, transports data generated by the depression of a key on keyboard 1 to interface 11. Interface 11 operates in a well known manner and may comprise any of a number of well known circuits such as the keyboard interface circuit used in the Hewlett-Packard Co. model 85 (hereinafter referred to as the HP-85) desktop computer. Interface 11 is operative to scan keyboard 1 and to detect key depressions thereon. When a key depression is detected, interface 11 ceases scanning and indicates that a key depression has occurred by setting the second bit of 8 bit status register 14 to a "1" state. Interface 11 confirms that a true key depression has occurred by scanning keyboard 1 once more after an 8 millisecond delay. If a key depression is detected, the 8 bit key code representing the depressed key is stored in 8 bit data register 12. Subsequently, when the depressed key is released, interface 11 clears the second bit of status register 14, resets data register 12 to zero, and begins scanning keyboard 1 again.

Microprocessor 13 is connected in a conventional manner to address/data buss 17, control buss 15, and to timing and clock circuitry. Microprocessor 13 may comprise, for example, the microprocessor used in the HP-85 desktop computer, and is operative to perform control functions in accordance with any of a number of well known synchronous interrupt service protocols, such as that used in the HP-85 desktop computer. At suitable interrupt times, as defined by the interrupt service protocol, microprocessor 13 interrogates interface 11 via control buss 15 to determine whether a key is currently depressed on keyboard 1. If the second bit in status register 14 is a "1", thereby indicating that a key is currently depressed, microprocessor 13 obtains the key code of the depressed key from data register 12 via address/data buss 17.

Read only memory (ROM) 19 contains instructions, e.g., various interrupt service routines, which are stored in assembly language and are to be implemented by microprocessor 13. ROM 19 is connected in a conventional manner to busses 15 and 17 and may comprise, for example, the ROM used in the HP-85 desktop computer. Random access memory (RAM) 21, which is also connected to busses 15 and 17 in a conventional manner, may comprise any of a number of commercially available memories. For example, RAM 21 may be constructed by connecting 8 each Intel Corp. 4116 devices in parallel. RAM 21 is used to store data in 8 bit bytes at specific memory locations and is available for storage of the user's BASIC program. RAM 21 includes flag register 23 and code register 25, each of which comprises a 2 byte memory location designated for the storage of specific data. RAM 21 also contains keydown table 27 which functions as a look-up table and may easily be implemented by persons of ordinary skill in the art as a variable string in BASIC. Subroutine 29 comprises a set of memory locations located within RAM 21 wherein a user's BASIC subroutine is stored.

Cathode ray tube (CRT) 31, which may comprise, for example a Ball Bros. Co. model TD-12 monitor, is connected to busses 15 and 17, and is responsive thereto, in a conventional manner as is exemplified by the connections and control methods used in the HP-85 desktop computer. Similarly, tape read/record device 33 is connected to busses 15 and 17 in a conventional manner and may comprise, for example, the device used in the HP-85 desktop computer.

Figure 3:
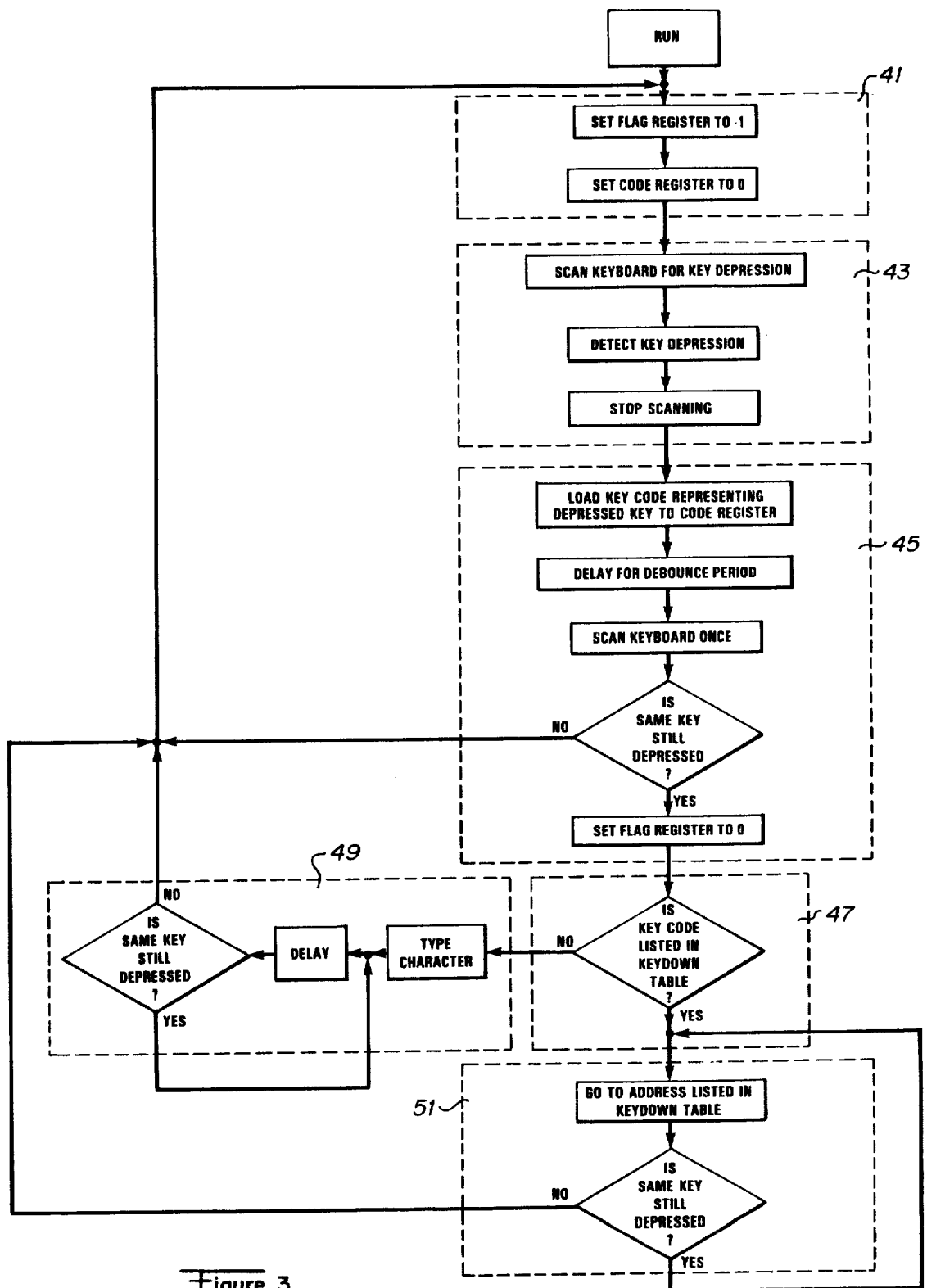
FIG. 3 is a flow chart of the operations performed by the electronic computer of FIG. 2.

Referring now to FIG. 3, there is shown a flow chart of the steps performed by computer 5 with regard to the depression of a key upon keyboard 1. In step 41 an initialization function is performed by microprocessor 13 wherein flag register 23 and code register 25 are set to values which indicate that no key is currently depressed upon keyboard 1. Step 43 is performed by interface 11 and microprocessor 13 as described hereinabove.

After obtaining the 8 bit key code from data register 12, microprocessor 13 implements the operations of step 45. Microprocessor 13 first causes the key code obtained from data register 12 to be stored in code register 25 via address/data buss 17. After delaying for a de-bounce period prescribed by a de-bounce protocol, as exemplified by the protocol used in the Radio Shack Corp. model TRS-80 computer, microprocessor 13 interrogates the second bit of status register 14 to ensure that the key is still depressed and a true key depression has, in fact, occurred. If a key is no longer depressed, as indicated by the presence of a "0" in the second bit of status register 14, steps 41 and 43 are repeated. If the presence of a "1" in the second bit of status register 14 indicates that a key is still depressed and a true key depression has occurred, microprocessor 13 causes a "0" value to be stored in flag register 23 to so indicate.

After a determination is made that a true depression has occurred, step 47 is implemented by microprocessor 13. In effect, a microprocessor 13 performs the function of a program counter set to the initial location of keydown table 27. Microprocessor 13 determines if the key code resident in code register 25 is listed in keydown table 27. If so, microprocessor 13 obtains the memory address from keydown table 27 which is associated with that key code. Persons of ordinary skill in the art will be able to implement this function in BASIC as the combination of an interrogation of a variable string, which returns the ordinal position of the key code therein, with a GOSUB command. Utilizing this BASIC implementation, a BASIC line number is returned to microprocessor 13.

IF the key code is found in keydown table 27 and a line number is returned, microprocessor 13 implements step 51 by performing the operations which commence at the received BASIC line number, wherein the operations of subroutine 29 are performed. When the performance of subroutine 29 is completed, microprocessor 13 interrogates the second bit of status register 14 to determine if the key is still depressed and either repeats step 51 or returns to step 41. If the key code was not found in keydown table 27, step 49 is performed. The operations of step 49 may be implemented, for example, by causing the failure to locate the key code in keydown table 27 to invoke a user-defined default BASIC subroutine which displays the character of the depressed key.

Figure 4:
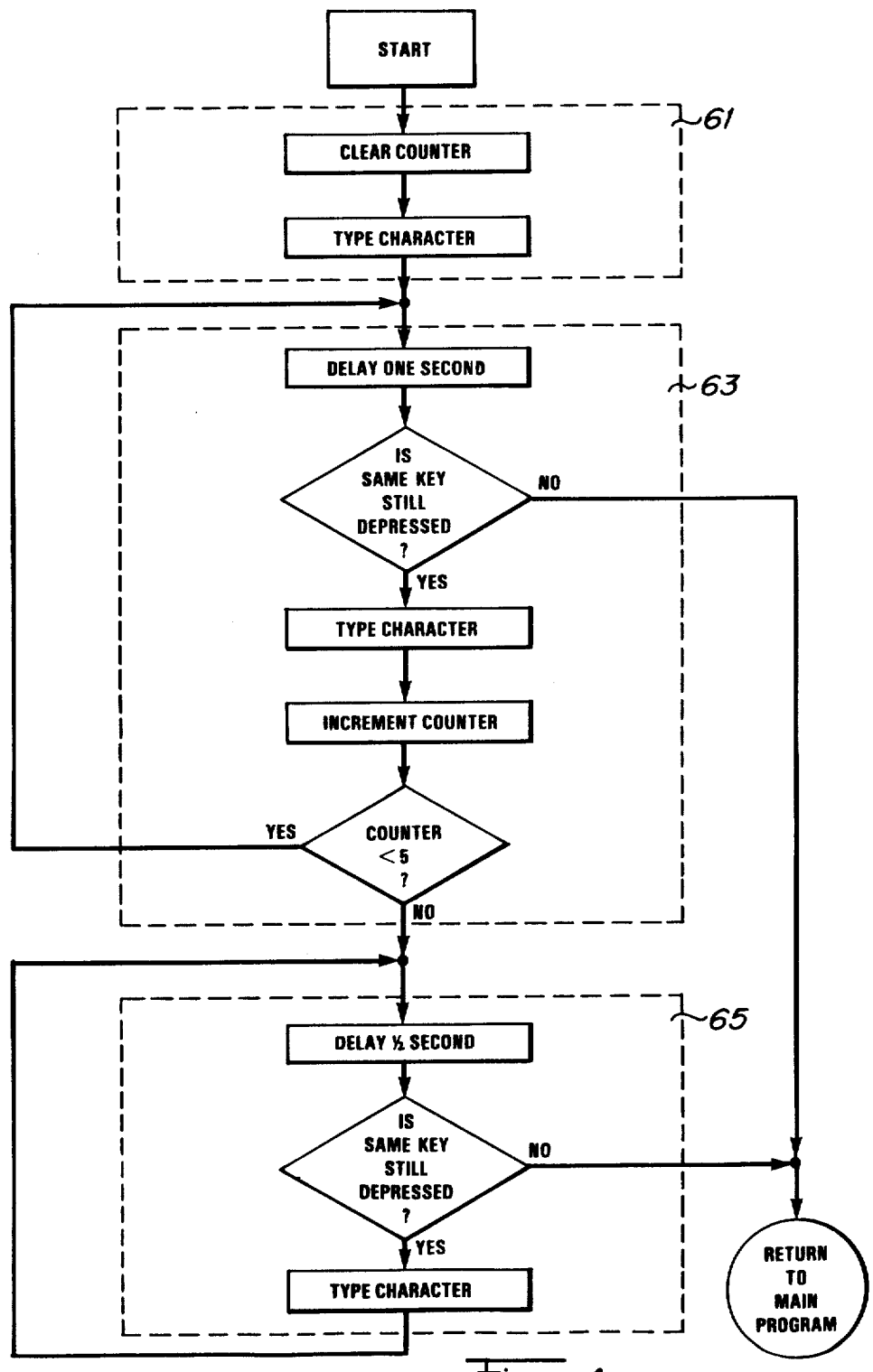
FIG. 4 is a flow chart of another operation performed by the electronic computer of FIG. 2.

Referring now to FIG. 4, there is shown a flow chart of a possible user-written subroutine 29 which would be implemented to cause characters to be displayed upon CRT 31 at a rate of speed which is dependent upon the amount of time that the desired key is held depressed on keyboard 1. In step 61, microprocessor 13 sets an internal counter to an initial value of 0 and then causes CRT 31 to display the character associated with the depressed key in a conventional manner as exemplified by the display routine used in the HP-85 desktop computer. In step 63, microprocessor 13 delays for one second and then interrogates the second bit of status register 14 to determine if the same key is still depressed. If the same key is no longer depressed, step 51 of FIG. 3 is returned to. If the same key is depressed, another character is displayed and the internal counter is incremented. If, after 5 characters are so displayed, an interrogation of the second bit of status register 14 indicates that the same key is still depressed, step 65 decreases the delay to one-half second and characters are displayed at this increased rate.

Returning now to FIG. 2, another embodiment of the present invention is also depicted. Buffers 71 and 73, which may comprise, for example, the buffer circuits used in the HP-85 desktop computer, operate to isolate busses 15 and 17 from interface 75. Interface 75 is operative to convert the information transported on busses 15 and 17 into information compatible with conventional instrumentation devices such as those used in oven 77. Interface 75 may comprise any of a number of commercially available interface circuits such as the GPIB interface circuit available from Hewlett-Packard Co. Oven 77, which may comprise, for example, a Thermodynamic Engineering Co. model 9214 temperature and humidity controlled chamber, is used to maintain a constant environment for testing purposes. Persons of ordinary skill in the art will be able to write a BASIC program for automatically controlling the environment within oven 77. Further, persons of ordinary skill in the art will be able to write a subroutine 29 which defines the depression of a specific key on keyboard 1 for a specified duration as a certain command to oven 77. For example, such a subroutine 29 might define the depression of the "A" key as a command to the control circuit of oven 77 to open a single cooling valve. Continued depression of the "A" key for more than 5 seconds might be defined as a command to the control circuit of oven 77 to open an additional cooling valve.

DETAILED LISTING OF ROUTINES AND SUBROUTINES

A complete listing of the routines and subroutines described hereinabove is given below. The routines entitled "Sample Code For FIG. 3" and "Sample Code For FIG. 4" implement the operations described in the flow charts of FIGS. 3 and 4, respectively. The specific listings for these routines given below are written in the "Hewlett-Packard Extended ANSI Minimal BASIC" language which is fully described in the publication entitled "Hewlett-Packard HP-85 Owner's Manual and Programming Guide" which is commercially available from Hewlett-Packard Co. as part number 00085-90002. Reading from left to right, the listings given below include a line number, a BASIC instruction, and, after the exclamation point, a comment. These routines are written by the user and are stored in RAM 21 in a conventional manner.

Listings of the subroutines called by the routines described just above are also given below. These routines are written in the "Hewlett-Packard HP-85 Assembly Language" which is fully described in the publication entitled "HP-83/85 Assembler ROM And HP-82928A System Monitor Manual" which is commercially available from Hewlett-Packard Co. as part number 00085-90444. Reading from left to right, the listings given below include a 4-digit item number, a 6-digit location (in ROM), a 9-digit octal instruction, a mnemonic instruction, and a comment. These routines are stored in ROM 19 and are not user-accessible.

```
100 ! !!!!!!!!!!!!!!!!!   !!!!!!!!!!!!!!!!!!!!!!!!!!  !!!!!!
110 !                                                        !
120 !       Sample code for Figure 3                         !
130 !                                                        !
140 ! !!!!!!!!!!!!!!!!!!!!!!!!!!!!!!!!!!!!!!!!!!!!!!!!!!!!!!!
150 ENABLE KBD 0 !         RUN, DISABLING KEYBOARD
160 F=-1 !                 SET FLAG REGISTER TO -1
170 C=0 !                  SET CODE REGISTER TO 0
180 !
190 IF KEY DOWN=-1 THEN 190 !  SCAN KEYBOARD FOR A KEY DEPRESSION
200 C=KEY DOWN !           LOAD KEY CODE TO CODE REGISTER
210 !     DEBOUNCE
220 WAIT 500 !             DELAY 1/2 SEC FOR DE-BOUNCE
230 IF KEY DOWN<>C THEN 160 ! IS SAME KEY STILL DEPRESSED?
240 !     LOOK UP
250 F=0 !                  SET FLAG REGISTER TO 0
260 X=POS("ARS",CHR$(C)) ! LOOK UP KEY CODE IN KEYDOWN TABLE
270 IF X<>0 THEN 400 !     IS KEY CODE IN KEYDOWN TABLE
280 !     NOT IN TABLE, DO DEFAULT
290 PRINT CHR$(C);!        TYPE CHARACTER
300 WAIT 200 !             DELAY
310 IF KEY DOWN=C THEN 290 ! IS SAME KEY STILL DEPRESSED?
320 GOTO 150 !             NO, REPEAT LOOP
400 !     KEY IN TABLE, DO SUBROUTINE
410 ON X GOSUB 500,600,700 ! GO TO SUBROUTINE FOR THAT KEY
420 IF C=KEY DOWN THEN 410
430 GOTO 150 !             DONE, REPEAT LOOP
500 PRINT
510 PRINT "ADDING GAS"
520 WAIT 500
530 RETURN
540 !
600 !     ACTION FOR SECOND KEYDOWN ENTRY
620 PRINT
630 PRINT "RELEASING GAS"
640 WAIT 500
650 RETURN
660 !
700 !     ACTION FOR THIRD KEY
710 !
720 BEEP 100,100
730 PRINT
740 PRINT "TEST ENDED"
750 PRINT
760 STOP
770 END 100 ! !!!!!!!!!!!!!!!!!!!!!!!!!!!!!!!!!!!!!!!!!!!!!!!!!!!!!!!!!
110 !                                                          !
120 !       Sample code for Figure 4                           !
130 !                                                          !
140 ! !!!!!!!!!!!!!!!!!!!!!!!!!!!!!!!!!!!!!!!!!!!!!!!!!!!!!!!!!
150 !     DUMMY MAIN PROGRAM
160 ON KBD GOSUB 500 !     ENABLE KEYBOARD INTERRUPTS
170 GOTO 170 !             WAIT FOR A KEYSTROKE
500 K$=KBD$ !              GET KEY CODE(S)
510 K=NUM(K$[LEN(K$)]) !   SAVE LAST KEY CODE
520 C=0 !                  CLEAR COUNTER
530 PRINT K$ !             TYPE CHARACTER(S)
540 ON KBD GOTO 700 !      ENABLE TRAPPING OF NEW KEYSTROKES
550 WAIT 1000 !            DELAY FOR 1 SECOND
```

```
560 IF K<>KEY DOWN THEN 700 !   IS SAME KEY STILL DEPRESSED?
570 PRINT CHR$(K) !             YES, TYPE CHARACTER
580 C=C+1 !                     INCREMENT COUNTER
590 IF C<5 THEN 550 !           COUNTER<5?, REPEAT SLOW LOOP
600 WAIT 500 !                  DELAY FOR 1/2 SECOND
610 IF K<>KEY DOWN THEN 700 !   IS SAME KEY STILL DEPRESSED?
620 PRINT CHR$(K) !             YES, TYPE CHARACTER
630 GOTO 600 !                  REPEAT FAST LOOP
700 ON KBD GOSUB 500 @ RETURN ! RESET INTERRUPT AND CONTINUE MAIN PROGRAM
710 END
```

```
6037 075150                 *           KEYDOWN::           KEYDOWN
6038 075150                 *               RETURNS KEY CODE OF KEY CURRENTLY DEP
6039 075150                 *               OR -1 IF NONE.
6040 075150                 *
6041 075150 000 055                     OCT 0,55            NUM FUN, NO ARGS
6042 075152 316 023 157     KEYD.       JSB =BSIN           SET UP REGS
6043 075155 222                         CLB R#              INIT DEBOUNCE TIMER
6044 075156 147 260 002     ISKEYD      LDBD R47,=KEYSTS    CHECK KBD STS
6044 075161 377
6045 075162 206                         LRB R47             IS A KEY DOWN?
6046 075163 363 013                     JEV NUKEYD          NO
6047 075165 146 212                     DCB R46             DOWN LONG ENOUGH?
6048 075167 366 365                     JNZ ISKEYD          NOT YET
6049 075171 260 003 377                 LDBD R#,=KEYCOD     GET IT
6050 075174 147 222                     CLB R47
6051 075176 360 225                     JMP GOSELR
6052 075200 146 223         NUKEYD      CLM R46             RETURN -1
6053 075202 213                         DCM R#
6054 075203 360 220                     JMP GOSELR
5517 073560                 *       ON KBD::            ON KBD [GOTO/GOSUB] line#)
5518 073560                 *
5519 073560 241                         OCT 241             BASIC STATEMENT
5520 073561 316 023 157     ONKBD.      JSB =BSIN
5521 073564                 *           LDMD R#,XR#,KEYRPT  GET REPEAT TIME
5522 073564 110 267 027                 STMD R10,XR#,KEYEOL SAVE BASIC.PC TO GOT
5522 073567 000
5523 073570 313 003 000                 ADM R10,=3,0        SKIP OVER GOTO/GOSUB
5524 073573                 *HOLDLP     LDBD R20,=KEYSTS    \  WAIT A WHILE
5525 073573                 *           LRB R20             \   OR UNTIL THE
5526 073573                 *           JEV NOHOLD          \   THE KEY IS LE
5527 073573                 *           DCM R46             /
5528 073573                 *           JNZ HOLDLP          /
5529 073573                 *           LDM R46,=377,2      \
5530 073573                 *           STMD R46,XR#,KEYRPT / SET REPEAT COUNTE
5531 073573                 *           LDBD R26,XR#,OLDKEY LOG KEY INTO BUFFER
5532 073573                 *           STBD R#,=GINTDS     TURN OFF INTERRUPTS
5533 073573                 *           JSB =LOGKEY
5534 073573 146 262 001     NOHOLD      STBD R46,=GINTDS    TURN OFF INTERRUPTS
5534 073576 377
5535 073577 250 377                     LDB R#,=TRUE        \  ARM FOR EOL SERVI
5536 073601 266 026 000                 STBD R#,XR#,KEYSVC  /
5537 073604 265 031 000                 LDMD R#,XR#,KBDCNT  \
5538 073607 367 003                     JZR SETISR          \   IF SOME KEYCODES
5539 073611 316 167 173                 JSB =LOGONK         /   THEN LOG EOL INT
5540 073614 250 001         SETISR      LDB R#,=1           ENABLE ON KBD LINK
5541 073616 266 242 000                 STBD R#,XR#,KEYON
5542 073621 262 000 377                 STBD R#,=GINTEN     RE-ENABLE INTERRUPTS
5543 073624 236                         RTN
5544 073625                 *
5545 073625                 *       OFF KBD::           OFF KBD
5546 073625                 *
5547 073625 241                         OCT 241
5548 073626 316 023 157     OFFK.       JSB =BSIN           \ CLEAR OUT GOTO/GOSU
5549 073631 223                         CLM R#              -  AND KBD$
5550 073632 267 031 000                 STMD R#,XR#,KBDCNT  KBD$ Overflow entry
5551 073635 267 027 000     OFFK++      STMD R#,XR#,KEYEOL  -   DISABLE ON KBD L
5552 073640 266 242 000                 STBD R#,XR#,KEYON
5553 073643 236                         RTN
5554 073644                 *
5555 073644                 *       KBD$::              KBD$ (NO ARGS)
5556 073644                 *
5557 073644 000 056                     OCT 0,56            STRING FUNC, NO ARG
```

```
5558  073646                      KBD$.    BSS  0                    \ RESERVE 80 BYTES
5559  073646 156 251 120                   LDM  R56,=120,0
5559  073651 000
5560  073652 316 053 077                   JSB  =RSMEM-              /
5561  073655 370 070                       JEN  NO_MEM               CAN'T GET IT
5562  073657 126 030 243                   STM  R26,R30              SAVE PTR TO RESERVED
5563  073662 316 023 157                   JSB  =RSIN                SET UP REGS
5564  073665 265 153 000                   LDMD R#,XR#,K_CNV         SET UP KBD CONVERSIO
5565  073670 070 243                       STM  R#,R70
5566  073672 262 001 377                   STBD R#,=GINTDS           DISABLE INTERRUPTS
5567  073675 176 056 265                   LDMD R76,X56,KBDCNT       GET NUMBER OF CHARAC
5567  073700 031 000
5568  073702 034 243                       STM  R76,R34              KEEP A COPY FOR STAC
5569  073704 367 023                       JZR  K_NOCH               IF THERE ARE NO CHAR
5570  073706 136 251 033                   LDM  R36,=KBDSAV          \ GET A POINTER TO
5570  073711 000
5571  073712 056 303                       ADM  R36,R56              /
5572  073714 132 036 340  K_LOOP  POBD R32,+R36                      GET CHARACTER FROM B
5573  073717 316 343 175                   JSB  =CNVCHR              CONVERT CHARACTER
5574  073722 132 026 344                   PUBD R32,+R26             PUSH CHARACTER INTO
5575  073725 134 213                       DCM  R34                  \ REPEAT UNTIL ALL
5576  073727 366 363                       JNZ  K_LOOP               /   ARE COPIED
5577  073731 176 012 345  K_NOCH  PUMD R76,+R12                      PUSH LENGTH
5578  073734 130 345                       PUMD R30,+R12             PUSH POINTER TO RESE
5579  073736 134 056 267                   STMD R34,X56,KBDCNT       CLEAR THE NUMBER OF
5579  073741 031 000
5580  073743 262 000 377                   STBD R#,=GINTEN           RE-ENABLE INTERRUPTS
5581  073746 236                           RTN
5582  073747                       *
5583  073747                       *       OUT OF MEMORY TRAP FOR RSMEM- USERS
5584  073747                       *               RETURNS NULL STRING
5585  073747                       *
5586  073747                      NO_MEM BSS  0
5587  073747 174 223                       CLM  R74
5588  073751 012 345                       PUMD R74,+R12
5589  073753 236                           RTN

######              ENABLE KBD :                                        ############
4153  075573 241                           OCT  241
4154  075574 316 311 172  EKBD.   JSB  =ONEREG                       INITIALIZE AND GET KBD
4155  075577 141 250 236                   LDB  R41,=236             GET A DUMMY RETURN
4156  075602 146 022 266                   STBD R46,X22,KBMASK       SAVE MASK IN R/W
4156  075605 216 000
4157  075607 310 377                       CMB  R46,=377             IF ALL KEYS ENABLED
4158  075611 367 004                       JZR  EK_OFF               .  THEN REMOVE MY ISR
4159  075613 141 261 224                   LDMD R41,=NEWKEY          \
4159  075616 173
4160. 075617 141 263 025  EK_OFF  STMD R41,=KYIDLE                   / PUSH IN CODE TO CAT
4160  075622 205
4161  075623 236                           RTN
4162  075624                       *
4163  075624                       *
4164  075624                       *
4165  075624 316 376 011  NEWKEY  JSB  =ROMJSB
4166  075627 233 173                       DEF  IOKBD.
4167  075631 300                           VAL  ROM#
4168  075632 236                           RTN
4169  075633                       *
4170  075633                       *
4171  075633                       *

######              KBD ISR FOR ENABLE KBD                              ############
4193  075633 262 001 377  IOKBD.  STBD R#,=GINTDS                    DISABLE INTERRUPTS
4194  075636 102 006 345                   PUMD R2,+R6               SAVE R2-3 BECAUSE SAV_I
4195  075641 316 141 164                   JSB  =SAV_IO              SAVE VARIOUS REGISTERS
4196  075644 126 260 003                   LDBD R26,=KEYCOD          GET KEYCODE
4196  075647 377
4197  075650 120 022 264                   LDBD R20,X22,KBMASK       GET ENABLE KBD MASK
4197  075653 216 000
4198  075655 116 310 002                   CMB  R16,=2               \
4199  075660 367 016                       JZR  MODE_R               \   IF RUN OR ON GOT
4200  075662 310 007                       CMB  R16,=7               /    THEN KBD ENAB
4201  075664 367 012                       JZR  MODE_R               /
```

```
4202  075666 310 004              CMB   R16,=4          \
4203  075670 367 013              JZR   MODE_I          \  IF INPUT EXEC OR
4204  075672 310 005              CMB   R16,=5          /     THEN KBD ENAB
4205  075674 367 007              JZR   MODE_I          /
4206  075676 360 114              JMP   KEY_OK          OTHERWISE - GIVE UP
4207  075700 120 206       MODE_R LRB   R20             \  RUN MODE - SHIFT M
4208  075702 206                  LRB   R20             \
4209  075703 206                  LRB   R20             /
4210  075704 206                  LRB   R20             /
4211  075705 120 317 017  MODE_I  ANM   R20,=17,0       MAKE SURE MASK IS 4 BI
4211  075710 000
4212  075711 367 051              JZR   NO_KEY          NO KEYS ARE ENABLED
4213  075713 124 251 001          LDM   R24,=1,0        SET UP 'REST' MASK
4213  075716 000
4214  075717 126 310 213          CMB   R26,=213        \
4215  075722 366 003              JNZ   TRYPAU          IF KEY = RESET THEN
4216  075724 124 250 010          LDB   R24,=10         /   SET UP 'RESET' MA
4217  075727 126 310 216  TRYPAU  CMB   R26,=216        \
4218  075732 366 003              JNZ   TRYSFK          IF KEY = PAUSE THEN
4219  075734 124 250 004          LDB   R24,=4          /   SET UP 'PAUSE' MA
4220  075737 126 310 226  TRYSFK  CMB   R26,=226        \
4221  075742 367 010              JZR   SFKFND          \
4222  075744                   *  BSS   0               \
4223  075744                   *                        \
4224  075744 310 200              CMB   R26,=200        \  IF KEY = KEYLABE
4225  075746 372 007              JNC   EKDONE          /    OR KEY = SFK
4226  075750 310 210              CMB   R26,=210        /    THEN SET UP '
4227  075752 373 003              JCY   EKDONE          /
4228  075754 124 250 002  SFKFND  LDB   R24,=2          /
4229  075757 124 020 307  EKDONE  ANM   R24,R20         CHECK FOR MATCH
4230  075762 366 030              JNZ   KEY_OK          IF KEY IS ENABLE LET I
4231  075764 132 260 121  NO_KEY  LDBD  R32,=KRPET1     RESET COUNTER
4231  075767 200
4232  075770 262 120 200          STBD  R32,=KEYCNT
4233  075773 250 001              LDB   R32,=1          RESTART SCANNER
4234  075775 262 003 377          STBD  R32,=KEYCOD
4235  076000 166 006 241          LDM   R66,R6          \
4236  076003 315 055 000          SBM   R66,=55,0       /  COMPUTE LOC. OF KYID
4237  076006                   *                        CHANGED FROM 45 TO 55 B
4238  076006                   *                        CHANGE IN SAV_IO ( SAVI
4239  076006 060 243              STM   R66,R60         SAVE IT
4240  076010 251 104 012          LDM   R66,=PADKBD     GET NEW RETURN ADDRESS
4241  076013 247                  STMD  R66,R60         PUSH INTO MIDDLE OF RET
4242  076014 316 212 164  KEY_OK  JSB   =RST_IO         RESTORE REGISTERS
4243  076017 102 006 343          POMD  R2,-R6          GET R2 OFF RETURN STACK
4244  076022                      IOKBDE BSS 0
4245  076022 262 000 377          STBD  R4,=GINTEN
4246  076025 236                  RTN
```

I claim:

1. An electronic computer comprising: a keyboard having a plurality of keys;

interface means, coupled to the keyboard, for detecting a depressed key thereon, for generating in response thereto a key code associated with the depressed key, and for presenting the key code at an interface output during a time period in which the depressed key is depressed;

a memory having a plurality of memory locations, each memory location being uniquely identified by a memory address;

table means for storing a plurality of individual key codes and for storing a plurality of individual memory addresses, each individual key code being associated with one memory address;

program counter means, connected to the memory, for selecting an addressable memory location;

first logic means, connected to the interface means, the table means, and the program counter means, said first logic means being operative for receiving the key code from the interface output, for interrogating the table means and for thereby determining a first memory address associated with the key code, and for directing the program counter means to select a first memory location uniquely identified by the first memory address;

timing means, connected to the interface means and having a timing output, for making a measurement of the time period and for continuously presenting at the timing output a duration signal representative of said measurement; and second logic means, connected to the program counter means and to the timing output, said second logic means being responsive to the duration signal and being operative for directing the program counter means to select a second memory location during a first portion of the time period and for directing the program counter means to select a third memory location during a second portion of the time period.

2. An electronic computer as in claim 1, further comprising:
   printing means, having an input for receiving the key code, for printing an alphanumeric character associated with the key code; and
   third logic means, connected to the program counter means and to the printing means, for presenting the key code to the printing means input, for causing the printing means to print the character a plurality of times at a first speed during the first portion of the time period and for causing the printing means to print the character a plurality of times at a second speed during the second portion of the time period.

3. An electronic computer as in claim 2, wherein the first speed is slower than the second speed.

* * * * *